United States Patent
Gebauer et al.

(10) Patent No.: US 9,562,663 B2
(45) Date of Patent: Feb. 7, 2017

(54) LIGHTING DEVICE IN A MOTOR VEHICLE WITH A LIGHT CONDUCTOR ARRANGEMENT

(71) Applicant: Automotive Lighting Reutlingen GmbH, Reutlingen (DE)

(72) Inventors: Matthias Gebauer, Reutlingen (DE); Andreas Ladenburger, Ulm (DE)

(73) Assignee: Automotive Lighting Reutlingen GmbH, Reutlingen (DE)

( * ) Notice: Subject to any disclaimer, the term of this patent is extended or adjusted under 35 U.S.C. 154(b) by 480 days.

(21) Appl. No.: 14/275,957

(22) Filed: May 13, 2014

(65) Prior Publication Data

US 2014/0340919 A1   Nov. 20, 2014

(30) Foreign Application Priority Data

May 14, 2013   (DE) .................. 10 2013 208 925

(51) Int. Cl.
| | |
|---|---|
| *B60Q 1/11* | (2006.01) |
| *F21S 8/10* | (2006.01) |
| *F21V 8/00* | (2006.01) |

(52) U.S. Cl.
CPC ........ *F21S 48/1329* (2013.01); *F21S 48/1241* (2013.01); *F21S 48/225* (2013.01); *F21S 48/2237* (2013.01); *F21S 48/2268* (2013.01); *F21S 48/2281* (2013.01); *F21S 48/2293* (2013.01); *F21S 48/236* (2013.01); *G02B 6/001* (2013.01)

(58) Field of Classification Search
CPC ...... B60Q 3/0289; B60Q 1/0011; B60Q 3/002
USPC ................................ 362/459–549, 551–582
See application file for complete search history.

(56) References Cited

U.S. PATENT DOCUMENTS

| | | |
|---|---|---|
| 2003/0006230 A1 | 1/2003 | Kaji et al. |
| 2006/0171137 A1 | 8/2006 | Tamaki |
| 2012/0250342 A1 | 10/2012 | Reuschel et al. |

(Continued)

FOREIGN PATENT DOCUMENTS

| | | |
|---|---|---|
| DE | 20206829 U1 | 9/2002 |
| DE | 10 2004 047 653 A1 | 5/2005 |

(Continued)

OTHER PUBLICATIONS

Oct. 10, 2014 European Search Report for European Patent Application No. 14165932.6-1504.

*Primary Examiner* — William Carter
(74) *Attorney, Agent, or Firm* — Howard & Howard Attorneys PLLC

(57) ABSTRACT

The present invention is directed toward a lighting device of motor vehicle with an arrangement of at least two light conductors. Each conductor includes one coupling arm having a first cross section, a light conductor area with a second cross section, and a transition area located between the coupling arm and the light conductor area. The coupling arms include a respective first contact surface, and the transition areas of the light conductors include a respective second contact surface. The contact surfaces are formed in such a way that the coupling arm of the one light conductor inserts into the transition area of the respective other light conductor. Each one of the two coupling arms include deflectors on a rear side of the coupling arm, which deflect towards the front side, within a section of the transition area where each respective coupling arm fits into the other light conductor.

14 Claims, 4 Drawing Sheets

(56) References Cited

U.S. PATENT DOCUMENTS

2013/0229815 A1    9/2013   Pfeil

FOREIGN PATENT DOCUMENTS

| | | |
|---|---|---|
| DE | 102005029363 A1 | 1/2007 |
| DE | 10 2011 016 002 B3 | 1/2012 |
| DE | 10 2011 000 038 A1 | 7/2012 |
| DE | 10 2011 112 321 B3 | 8/2012 |
| EP | 2048430 A2 | 5/2009 |
| EP | 2397876 A2 | 12/2011 |
| EP | 2 565 689 A1 | 3/2013 |
| WO | 2012/093135 A1 | 7/2012 |

LIGHTING DEVICE IN A MOTOR VEHICLE WITH A LIGHT CONDUCTOR ARRANGEMENT

CROSS-REFERENCE TO RELATED APPLICATION

This application is based upon and claims priority to German Patent Application DE 102013208925.2 filed on May 14, 2013.

BACKGROUND OF THE INVENTION

1. Field of Invention

The present invention relates to lighting devices for motor vehicles and, more specifically, to a lighting device with a light conductor arrangement.

2. Description of Related Art

Lighting devices for motor vehicles that have a light conductor arrangement, as known in the art, typically include a front side, an opposing rear side that has light deflectors, and side areas connecting the front and the rear side. These sides are arranged in such a way that light, which experiences a total internal reflection on the side areas and on the front side, is directed into a longitudinal direction of the light conductor arrangement, so as to allow light reflected at the light deflectors to emit through the front side. Such a lighting device in a motor vehicle is known from Published German Application DE 102005029363A1, wherein the light conductor is designed as a light ring. The diameter of the light ring is a multiple of the size of the cross section of the light conductor, and the longitudinal expansion of the light ring is proportionally larger than its lateral extension. Thus, the light ring can be described as an elongated light conductor. Prisms serve as deflectors and direct the light onto the front side at such a steep angle that the light does not experience a total internal reflection and will be emitted out of the ring. The ring is not realized as an infinite loop, but has two ends which cross approximately at right angles and interpenetrate each other. The coupling of light is achieved via the two respective end faces, which is disadvantageous in that a closed and illuminated contour cannot be accomplished with this structure.

It is also possible to use a structurally closed ring, where light is coupled radially and then directed into the desired tangential circumferential direction by a deflector arranged inside the ring. This can be accomplished, for example, with minor elements set in a 45° angle with regards to the radial direction. However, this is disadvantageous in that the deflection which occurs at the coupling of the light is clearly perceivable. Thus, this structure also does not accomplish a closed ring-shaped illuminated appearance.

From Published German Utility DE 202 068 29 U1, a light having a light guide body made in the basic shape of a glass pane is known. A deflector is arranged in the center of a glass pane area, which deflects the light from a light source positioned centrally in front of a center point of the glass pane area, and which emits light into the direction of the glass pane area, radially towards the outside. Along the outer periphery, a further circumferential deflector is integrated into the glass pane, which lets the incident light emit there via a glass pane area. The disadvantage of this light is that the inner area of the glass pane has to be reserved for the light paths of the light that is radially deflected towards the outside. As such, no other components of other light functions can be arranged in this inner area. For example, an arrangement in which day time running light is aligned round about a head light cannot be accomplished.

In view of the above, there remains a need in the art for a lighting device which omits the mentioned disadvantages or which at least minimizes them. Specifically, there is a need for the realization of a ring-shaped light, in which the inner area has space for components of other light functions and which provides a homogeneous brightly illuminated appearance alongside a closed contour.

SUMMARY OF THE INVENTION

The present invention overcomes the disadvantages in the related art in a lighting device for a motor vehicle with a light conductor arrangement. The light conductor arrangement includes at least one first light conductor and a second light conductor, wherein each one of the two light conductors includes one coupling arm having a first cross section, a light conductor area with a second cross section, and a transition area located between the coupling arm and the light conductor area, and in which the cross section is continually and monotonously enlarging from the first cross section until the second cross section. The coupling arm of each of the two light conductors include a respective first contact surface and the transition area of each of the two light conductors include a respective second contact surface, wherein the first contact surfaces and the second contact surfaces are formed in such a way that the coupling arm of the one light conductor inserts into the transition area of the respective other light conductor, whereby the second contact surface of the transition area of the one light conductor fits into the first contact surface of the coupling arm of the other light conductor, and that in a section of the transition area where each respective coupling arm fits into the other light conductor. Each one of the two coupling arms includes deflectors on a rear side of the coupling arm which deflect towards the front side of it.

In this way, the present invention effects an unproblematic coupling of light through the end faces of the coupling arms, which serve as light incidence areas and an assembly of the two light conductors, so that they appear to the observer to be a continuous structure, which also allows for closed ring shapes, in the center of which other components of other light functions can be arranged. There is a certain focusing of the light that is incident in this transition area, as ach of the two light conductors includes one coupling arm having a first cross section, a light conductor area with a second cross section, and a transition area located between the coupling arm and the light conductor area whose cross section is continually and monotonously enlarging from the first cross section until the second cross section. This is due to the geometry; the angle of beam of the light that transfers from the transition area into the neighboring light conductor area has a smaller angle of beam than the light coming from the coupling arm into the transition area. This improves the light transport in the light conductor areas. Because the coupling arm of the one light conductor inserts into the transition area of the other light conductor respectively, whereby the second contact surface of the transition area of the one light conductor fits into the first contact surface of the coupling arm of the other light conductor, the result for the observer is the desired impression of a continuous structure.

Because each one of the two coupling arms includes deflectors on a rear side of the coupling arm which deflect towards the front side of it, within a section of the transition area where each respective coupling arm fits into the other light conductor, there is a coupling out of light even in the area where the light conductors are aligned alongside each other and where light is coupled in. This leads to the desired homogenous appearance which cannot be achieved by radial coupling, as known in the prior art.

In one embodiment, the light conductor arrangement is made in a closed ring shape. Each coupling arm with its light conductor may be made in one piece and form a firmly bonded and continuous unit. In this way, a high efficiency factor of the coupling of light into the light conductor is achieved. Further, the contact surfaces may be arched in the respective direction in which the cross section is enlarging, whereby the contact surface of the transition area is concave and the contact surface of the coupling arm is convex. With this kind of curving, the light propagated in the coupling arm can be deflected equally and with low loss into the light conductor direction. Further still, the first cross section may be half the size of the second cross section, whereby a maximum size of coupling cross sections can be achieved with a symmetrical division into two coupling arms. Advantageously, the contact surfaces may only touch to the extent that they are separated by a minimal air gap for the major part of their surface, whereby an undesired optical contact is minimized, which light could otherwise undesirably transfer from the one light conductor into the other light conductor. Further, it is advantageous if the widths of the deflectors of the light conductors, which are aligned alongside each other in the transition area, add up to a width that corresponds to the width of the deflectors that are arranged outside of the transition area, or that the widths of the deflectors of the light conductors, which are aligned alongside each other in the transition area, add up to a width that is larger than the width of the deflectors that are arranged outside of the transition area. It will be appreciated that the added width is a construction parameter, with which the amount of light that is coupled out can be influenced. The larger that added width, the more light is being coupled out. The embodiments allow for an adjustment of the brightness in such a way that the transition area will be just as brightly illuminated as the neighboring light conductor areas respectively.

In one embodiment, a coupling arm of a light conductor is set in an angle with the light conductor area of the respective other light conductor, which is defined in each case by guiding lines of the light conductor area and of the coupling arm. Further, this angle may decrease continually with increasing approximation of the coupling arm of the one light conductor towards the light conductor area of the other light conductor, until it has reduced to the value of zero and the guiding lines of the coupling arms thus run parallel to the guiding lines of the light conductor area. In a way, the light is thus being coupled into the preferred transport direction, which contributes to a homogeneous appearance. Advantageously, the first cross sections of the coupling arms totally disappear inside the cross section of the corresponding light conductor, respectively. This achieves a good efficiency factor of the coupling and a good appearance of the light conductor arrangement, because distracting levels can be avoided (for example).

In one embodiment, the two half cross sections, where one belongs to a transition area and the other to a coupling arm, add up to a total cross section at the point where the guiding lines show a parallel course. The desired result of this is that the entire cross section is homogeneously illuminated with focused light, which is advantageous for the further transport and the further use of the light beam in the light conductor arrangement. In one embodiment, the contact surfaces of the two light conductors of the light conductor arrangement run tangential towards each other. In this way, undesired large air gaps are avoided. Advantageously, the front side, which serves as the light output side, is curved convexly. This improves the appearance, since the deflectors that can be seen through the light conductor arrangement, and those are arranged on the rear side (away from the observer), appear wider than they really are. Further, the light conductor arrangement may include a cross section geometry, which is arranged in such a way, that through the lens effect that is achieved by the material of the light conductor arrangement and the curvature of its front side, and the width of the light deflectors as well as the remaining width of the side areas outside of the light deflectors in this direction, are mutually aligned in such a way that only the light deflectors are visible through the front side and that the side areas are no longer visible.

Other objects, features and advantages of the present invention will be readily appreciated as the same becomes better understood after reading the subsequent description taken in connection with the accompanying drawings.

BRIEF DESCRIPTION OF THE DRAWINGS

Embodiments of the invention are depicted in the drawings and will be further explained in the following descriptions. Herein, same reference signs depict the same elements in the different Figures. It is depicted, in schematic form respectively:

FIGS. 4A-4B show an enlarged section from FIG. 3 for the area where the light is coupled in;

FIG. 6 shows an appearance of the light conductor arrangement from FIG. 3 with the light sources turned on.

DETAILED DESCRIPTION OF THE INVENTION

Figure 1:
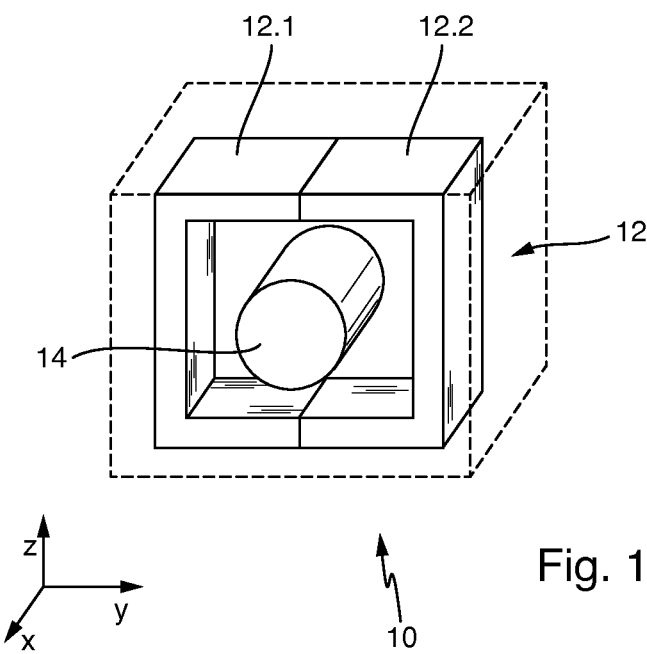
FIG. 1 shows the technical surrounding of the invention in the form of a lighting device in a motor vehicle with a light conductor arrangement featuring two light conductors.

Referring now to the Figures, where like numerals are used to designate like structure, FIG. 1 depicts a lighting device in a motor vehicle 10 with a light conductor arrangement 12, which includes two light conductors 12.1 and 12.2. The arrangement of at least two light conductors in an alignment where they supplement each other is one characteristic of the invention. In addition, FIG. 1 depicts a light module 14 and a three-dimensional coordinate system with the directions x, y, and z. The lighting device 10 is either a light that fulfills some signal function and/or a headlight which fulfills some lighting function.

In one embodiment, light module 14 is a head light module, which provides a low beam- and/or a high beam light. In other embodiments of the lighting device in a motor vehicle, the light module 14 can also be left out or can fulfill a signal light function. Examples of signal light functions are position light functions, daytime running light, indicator lights, and brake lights. As an alternative or in addition to fulfilling a signal light function, the light conductor arrangement 12 could also be used to produce a fog light distribution. Due to the aptitude of the elongated and closed ring-shaped light conductor arrangement 12 for fulfilling general signal light functions, the invention is not limited to the use of head lights and can also be used for rear- or front lights. Therefore, depending on its embodiment, the lighting device 10 is any given light in a motor vehicle. The spatial direction x points to a main beam direction of the lighting device 10. If the lighting device 10 serves as a head light, the direction x corresponds to the driving direction. If the lighting device 10 is a rear light, the direction x is opposite to the driving direction. The spatial direction y is located parallel to a transverse axis of the vehicle and the spatial direction z is located parallel to a vertical axis of the vehicle.

Figure 2:
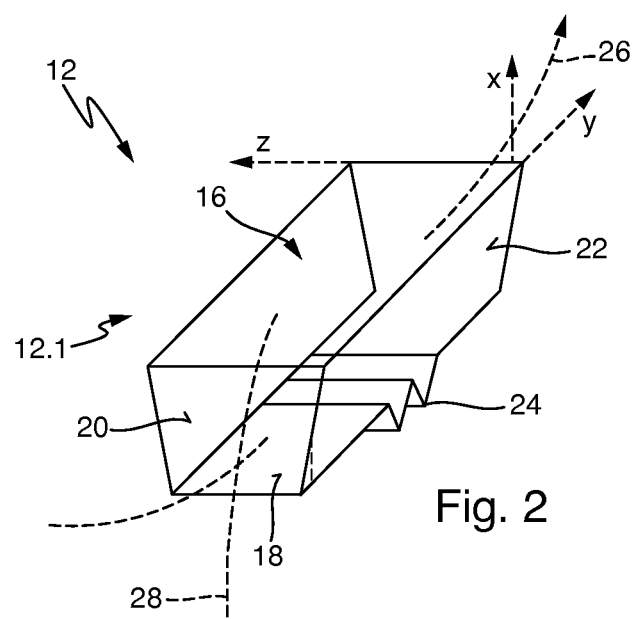
FIG. 2 shows a section of a light conductor of FIG. 1 in a perspective and in a schematic depiction.

FIG. 2 depicts a section of a light conductor arrangement 12 in a schematic way and in a perspective view. In view of the characteristics depicted in FIG. 2, it is hereby not important to which one of the two light conductors this section is belonging to. The light conductor arrangement 12 features a front side 16, a rear side 18, and as well as side areas 20, 22 which connect the front side 16 and the rear side 18. The rear side includes light deflectors 24 that may have, for example, the form of the depicted prisms and which are constructed as deepenings in the rear side 18 or as elevations on the rear side 18. Due to its form and material properties, the light conductor arrangement 12 is designed is such a way that light which is propagated inside of it, and that experiences a total internal reflection on the side areas 20, 22 and on the front side 16, is directed into a longitudinal direction 26, and to let light which was reflected at its light deflectors 24 to emit through the front side 16. Thus, the front side in particular serves as the light output area of the light conductor arrangement 12. For reasons of clarity, only two light deflectors 24 are depicted in FIG. 2. Independent of this simplified depiction, the light conductor arrangement 12 could include a plurality of light deflectors 24 distributed on the rear side 18 in a predefined way arranged in an evenly distributed way. This description holds true for all embodiments, independent from the light conductor geometry of this Figure, which is merely depicted in a schematic way.

In one embodiment, light conductor arrangement 12 includes a ring-shaped form, wherein the area closed in by the ring is located in the y-z plane and is thus vertical to the direction of the beam (see FIG. 1). However, the at least two light conductors could be configured differently and do not have to extend towards a closed ring. The dashed arrow 26 represents a longitudinal direction of light conductor arrangement 12, which can also be understood to be a guiding line. The guiding line 26 can be understood to be a path of the focal points of the cross sections of light conductor arrangement 12. This would indicate a respective cross section area, whose surface is normally located parallel to the longitudinal expansion of the light conductor arrangement 12. In order to illustrate this, a light conductor will be considered, independent from the one of FIG. 2, which has the shape of a long cylinder. In this case, the cross sections are circular areas, the centroids of the sections are the geometrical center points, and the guiding line would thus be the cylinder axis.

In the case of an elongated light conductor, the main direction of light that is propagated in it would basically follow the guiding direction of the light conductor. The curved course of the guiding line 26 in FIG. 2 indicates a curved course of the light conductor arrangement 12. Such a course if preferred, since too sharp radii and in particular corners, as they are depicted in FIG. 1, could lead to an undesired coupling out of light. FIG. 1 is thus only to be understood as a schematic overview display.

Figure 3A:
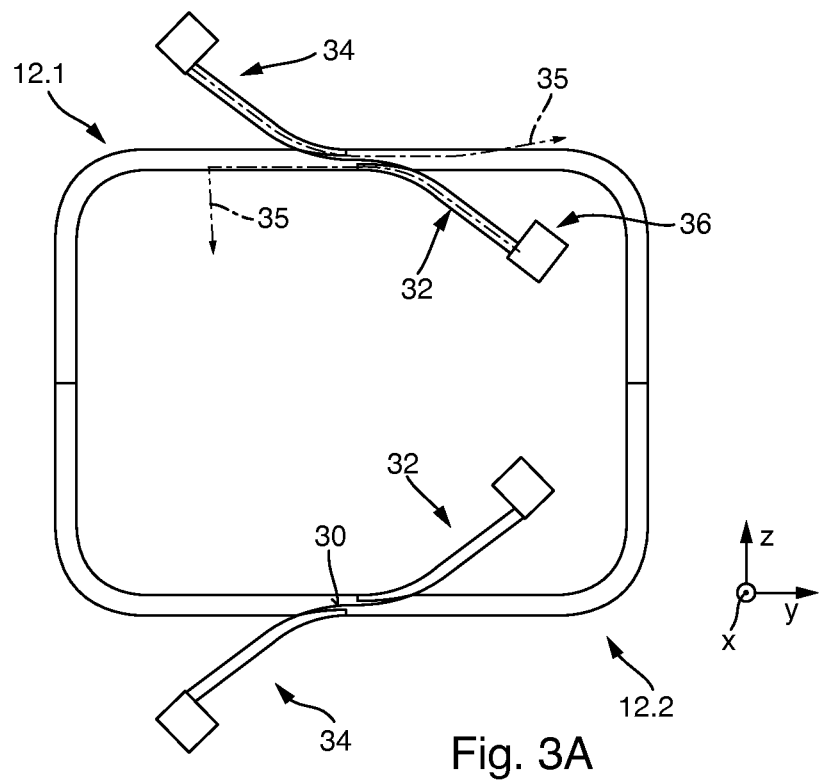
FIGS. 3A-3B show a light conductor arrangement that highlights characteristics of the invention.
Figure 3B:
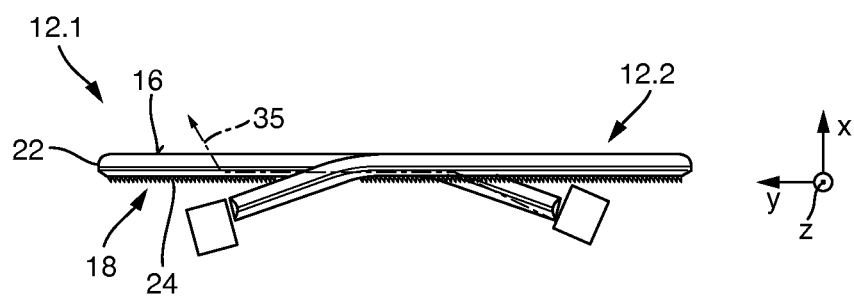

FIGS. 3A-3B depict a light conductor arrangement with more realistic radii. Hereby FIG. 3A shows a front view and FIG. 3B a top view. The light conductor arrangement 12 features a first light conductor 12.1 and a second light conductor 12.2. The two light conductors are optically separated from each other by air gaps 30, which result in the arrangement between the contact surfaces of the light conductors. Each one of the two light conductors features at least one coupling arm 32, 34. The embodiment depicted in FIGS. 3A-3B features two coupling arms for each one of the two light conductors, respectively. The two coupling arms 32, that are located towards the inside of the ring, belong to the first light conductor 12.1, and the two coupling arms 34, that are located towards the outside of the ring, belong hereby to the second light conductor 12.2. One coupling arm 32 towards the inside of the ring and one coupling arm 34 towards the outside of the ring respectively are aligned in such a way that they run tangentially past each other, and are thus anti-parallel towards each other. Light 35 is coupled into these coupling arms (which form respective pairs) in opposing propagation directions. The light comes from a respective light source 36, which is arranged at the distal end of the coupling arm and which couples light via an end face of the coupling arm into the coupling arm. Advantageously, the light source 36 is a subassembly of a semiconductor light source, its circuit board, and its cooling element. Each coupling arm forms a single-piece unit with its light conductor and thus a firmly bonded unit, so that the light 35 that has been coupled into the coupling arm is spread and distributed in the associated light conductor, until it hits a deflector 24, that is arranged on the rear side 18, and is subsequently emitted out via a front side 16 of the light conductor. FIG. 3B depicts the light conductor arrangement 12 in a top view, consisting of a front side 16 and a rear side 18 that is located opposite of it, and which features light deflectors 24. The front side and the rear side are connected by the side areas 22.

Figure 4A:
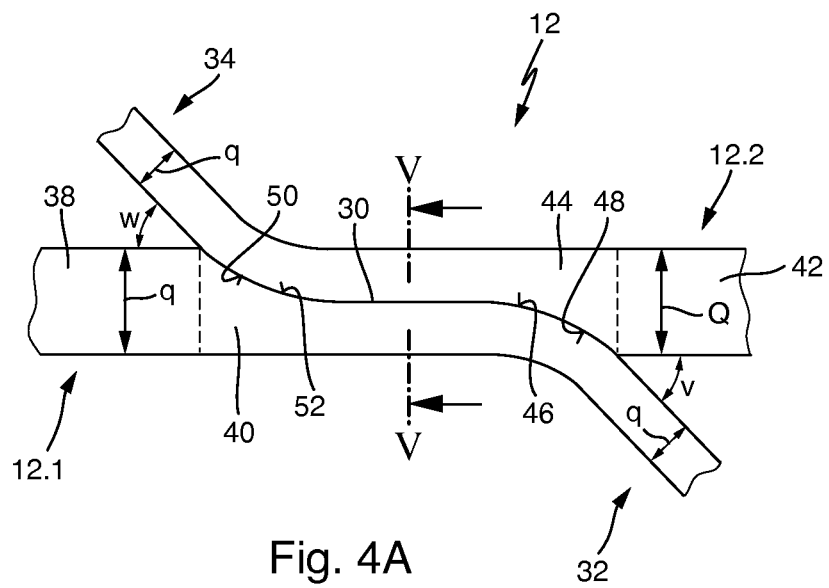
Figure 4B:
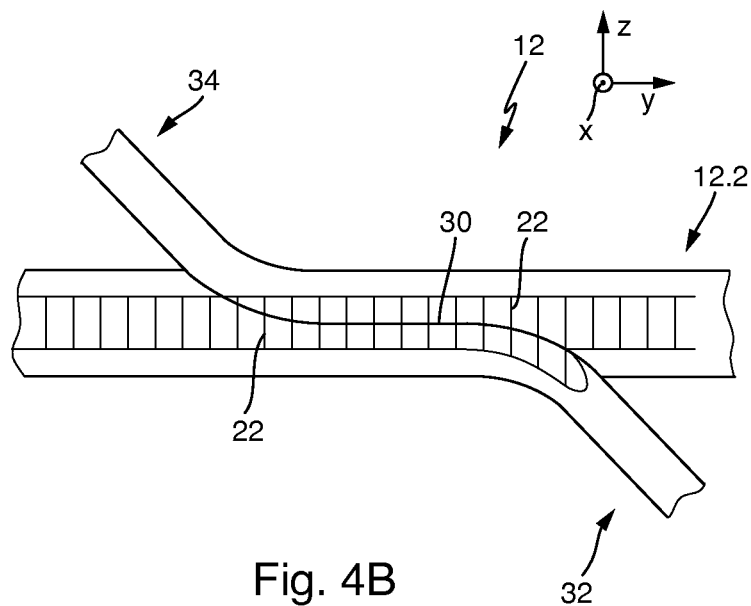

FIGS. 4A-4B depict enlarged sections of FIGS. 3A-B, respectfully, for the area for light coupling. In detail, FIGS. 4A-4B depict a light source arrangement 12, which includes a first light conductor 12.1 and a second light conductor 12.2. The first light conductor includes a coupling arm 32 with a first cross section q, a light conductor area 38 with a second cross section Q, and a transition area 40. The transition area 40 is located between the coupling arm 32 and the light conductor area 38. The second light conductor 12.2 includes a coupling arm 34 with a first cross section q, a light conductor area 42 with a second cross section Q, and a transition area 44. The transition area 44 is also located between the coupling arm 34 and the light conductor area 42. That the cross section of the transition areas 40, 44 enlarges from the respective direction of light propagation continually and monotonously from the first cross section q until the second cross section Q, applies to both transition areas 40, 44. The coupling arm 32 of the first light conductor 12.1 includes a first contact surface 46, and the transition area 44 of the second light conductor 34 includes a second contact surface 48. The coupling arm 34 of the second light conductor 12.2 includes a first contact surface 50, and the transition area 40 of the first light conductor 32 includes a second contact surface 52. Between contact surfaces aligned alongside each other, there occurs the respective air gap mentioned in connection with FIGS. 3A-B. The first contact surfaces and the second contact surfaces are shaped in such a way that the coupling arm of the one light conductor inserts into the transition area of the other light conductor. Hereby, the second contact surface of the transition area of the one light conductor fits into the first contact surface of the coupling arm of the other light conductor. As shown in FIG. 4B a section of the transition area where each respective coupling arm 32, 34 fits into the other light conductor, each one of the two coupling arms 32, 34 includes deflectors 24 on a rear side of the coupling arm which deflect towards the front side. Due to the transparency, the deflectors 24 are visible through the light conductor. The deflectors of the light conductors, which are located alongside each other in the transition area, may add up to a width that corresponds to the width of the deflectors that are arranged outside of the transition area. (see FIG. 4B, left). Alternatively, it is possible that the widths of the deflectors alongside each other in the transition area may add up to a width that is larger than the width of the deflectors that are arranged outside of the transition area (see FIG. 4B, right). The added width is a construction parameter, with which the amount of light which is coupled out can be influenced. The larger that added width is, the more light is being coupled out. It is preferred that the width will have a respective size, such that the respective transition area will be illuminated just as brightly as the neighboring light conductor areas. Between the contact surfaces of the two light conductors which are aligned alongside each other, a narrow air gap 30 is formed, such that there is essentially no optical contact between the contact surfaces. Thus, when the respective contact surfaces are viewed from the inside of the associated light conductor, a bordering surface appears at which total internal reflections may be occurring, so that no light is able to transfer into the respective other light conductor. Light, which has been coupled into a distal end at the end face of a coupling arm, therefore propagates within the associated light conductor until it is being coupled out of the light conductor via the front side, after having been reflected by one of the deflectors 24 of the light conductor. Since the coupling arms and the transition areas of the two light conductors include deflectors aligned alongside each other, it is possible to couple out light there in the same way as in the remaining areas of the light conductor. In one embodiment, the forms and cross sections of a coupling arm of the one light conductor and of the transition area of the other light conductor complement each other to one total cross section, which is at least as big as the cross section of the light conductor that is connected to the transition area. In this way, a sufficient amount of adequately large deflectors can be arranged in the rear side of the transition area of the one light conductor and of the coupling arm of the other light conductor that is aligned alongside of it, in order to couple out as much light there as is coupled out in the neighboring single-piece light conductor areas. In this way, a very homogeneous brightly illuminated total appearance of the light conductor arrangement is accomplished, in which the location of the light coupling does not stand out as a result of an otherwise inhomogeneous brightness.

Both coupling arms depicted in FIG. 4 are set in an angle v, w with the light conductor area of the respective other light conductor. In each case, this angle v, w is defined the guiding lines of one of the two light conductors and of the coupling arm of the respective other one of the two light conductors. The light conductor arrangement may be arranged in such a way that this angle v, w decreases continually with increasing approximation of the coupling arm of the one light conductor towards the light conductor area of the other light conductor, until it has reduced to the value of zero and the guiding lines of the coupling arms thus run parallel to the guiding lines of the light conductor area. The first cross sections q of the coupling arms thus totally disappear inside the cross section Q of the corresponding light conductor respectively. To that end, the contact surfaces only touch to the extent that they are separated by a minimal air gap 30 for the major part of their surface. At the point where the guiding lines have a parallel course, the two half cross sections (one being from a transition area and the other being from a coupling arm) add up to one total cross section. The term "total cross section" refers to a cross section of the light conductor area, or a single-piece solid cross section of the light conductor arrangement as it is outside of the transition area.

In one embodiment, the coupling is accomplished primarily orthogonally with regards to the edges of the light deflectors 24, which are designed as prisms, and which are aligned transverse to a guiding line 26 in FIG. 1. When the section plane is moved in the direction in which the light is propagated inside the coupling arm, the cross section of the coupling arm increases until it reaches the size of the total light conductor cross section, and the respective complementary cross section of the transition area decreases until it has fully disappeared. To the extent that the cross section of the transition area of the one light conductor increases opposite to the direction of the light that is propagated in it, the coupling arm of the other light conductor runs tangential to it towards one side, all the way to its distal end with the light source that is arranged there. Alongside the division between the contact surfaces of the two light conductors of the light conductor arrangement, the contact surfaces run tangential towards each other.

Figure 5:
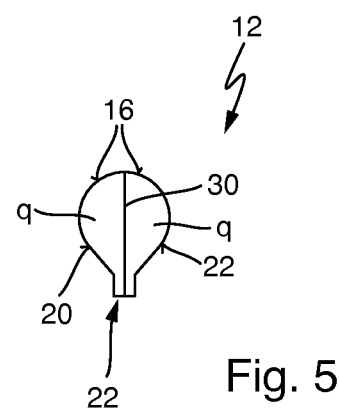
FIG. 5 shows a cross section of a light conductor arrangement in a central coupling area of a light conductor arrangement which highlights characteristics of the invention.

FIG. 5 depicts a preferred cross section of the light conductor arrangement in a central area of the two contact surfaces of a coupling arm and a transition area, as they are aligned alongside each other. The total cross section Q is divided here into two equally sized semi cross sections q. The intersecting line between the two semi cross sections defines the location of the air gap 30 between the two contact surfaces that are aligned alongside each other, and runs between the center of the elliptic or round front side 16 and the center of the rear side with the deflectors 24. The front side 16, which serves as light output side, is convexly curved in the depicted embodiment. Thus, a lens effect is achieved, which enlarges the visible width of the light deflectors 24 at the expense of the visible width of the slanting side areas 20, 22, when viewed through the front side 16.

Figure 6:
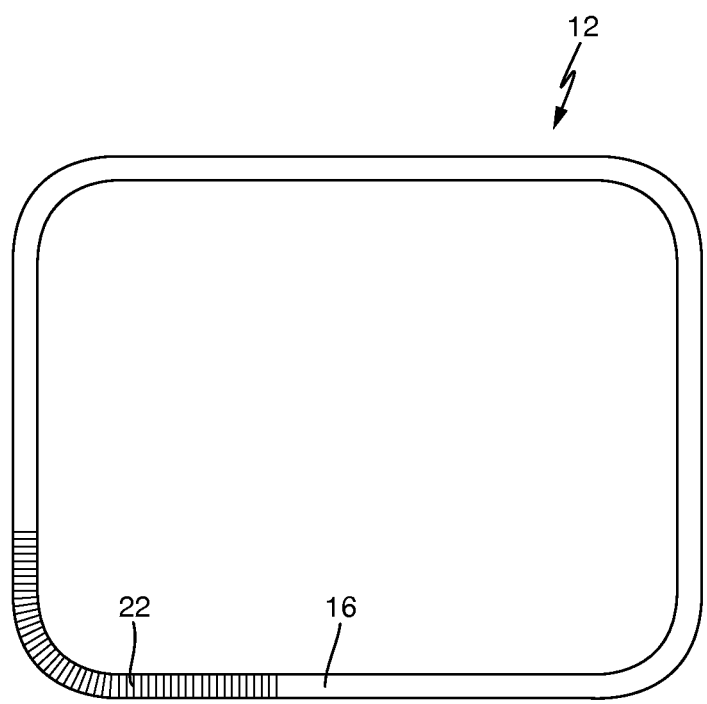

In one embodiment, a cross section geometry where a lens effect is achieved by the material of the light conductor 12 and the curvature of its front side 12, where the width of the light deflectors 24 as well as the remaining width of the side areas 20, 22 outside the light deflectors are adjusted in their direction in such a way that only the light deflectors 24 are visible through the front side 16, whereas the side areas 20, 22 are no longer visible through it. The result would be the appearance, as it is depicted in FIG. 6, where the width of the light deflectors 24, as they appear through the front side, extends over the entire width of the front side 16, which serves as the light output area. The visible deflectors 24 are only depicted in the lower left part of FIG. 6. Advantageously, they are visible over the entire front side 16, so that the desired homogeneous appearance is achieved. The homogeneity is further enhanced, in that the appearing visible width of the deflectors corresponds to the width of the front side.

In one embodiment, the light conductor arrangement features a first light conductor and a second light conductor. The light conductor arrangement includes a front side and opposite of it a rear side having light deflectors, as well as side areas connecting the front and the rear side being arranged in such a way that light, which experiences a total internal reflection on the side areas and on the front side, is directed into a longitudinal direction of the respective light conductor section, and to let light which has been reflected at its light deflectors emit through the front side. Each one of the two light conductors includes a coupling arm with a comparatively small cross section q, a transition area in which the comparatively small cross section q transfers to a comparatively large cross section Q and a light conductor area with the comparatively large cross section Q. Each coupling arm has a light incidence area on its distal end that is pointing away from the transition area. The transition area and the coupling arm of each of the two light conductors includes respective contact surfaces, which are formed in such a way that the coupling arm of the one light conductor inserts into the transition area of the respective other light conductor, so that the light conductors in the light conductor arrangement are arranged in such a way that that the contact surface of the transition area of the one light conductor may fit into the contact surface of the coupling arm of the other light conductor. Hereby, each of the two light conductors appears to be an extension of the respective other light conductor, different from the coupling arms. Each one of the two coupling arms may carry light to the deflectors that deflect it to its front side, within the transition area where it runs alongside the respective other light conductor. The contact surfaces are arched in the respective direction in which their cross sections enlarge. Hereby, the contact surface of the transition area is concave and the contact surface of the coupling arm is convex. In the direction in which the cross sections are located between the transition areas of the two light conductors, spanning between the center of the rear side and the center of the front side of the two light conductors and vertical to the direction in which the cross sections are enlarging, the contact surfaces of the coupling arms and of the transition area are plane. This is depicted in the straight air gap 30 in FIG. 5. The light conductors are arranged in such a way that in the sections of the two light conductors aligned alongside each other (coupling arms, transition areas), the light in one of the two light conductors propagates in one direction which is opposite to the propagation direction of the light in the other one of the two light conductors.

If the light conductor arrangement depicted in FIG. 4 is considered alongside a path which follows the direction of the coupled light, it is possible to divide it into four sections. In a first section of the light conductor arrangement, a distance between the first light conductor 12.1 and the coupling arm 34 of the second light conductor 12.2 in a direction of the main light propagation of coupling arm 34 of the second light conductor 12.2 gets smaller. In a second section of the light conductor arrangement, the first section is connected in the direction of the main light propagation of coupling arm 34 of the second light conductor 12.2. In the second section of the light conductor arrangement, the cross section of coupling arm 34 of the second light conductor 12.2 is constant. The cross section of the first light conductor 12.1 decreases there in the direction of the main light propagation of coupling arm 34 of the second light conductor 12.2, until it corresponds in form and size to the cross section of coupling arm 34 (which is constant in this section), so that the total cross section of the arrangement at this location is supplied in equal parts by the coupling arm 34 and by the light conductor arm 12.1. The second section of the light conductor arrangement ends here, and a third section of the light conductor arrangement begins. In the second section of the light conductor arrangement 12, the boundary surface 50 of the coupling arm 34 facing the first light conductor 12.1 includes a shape that is complementary to the boundary surface 52 of the first light conductor 12.1 that faces the coupling arm 34. Thus, these two boundary areas form contact surfaces that fit into each other. Thus, the two surfaces 52, 54 feature normals for pairs of points, of which a first point is located in a first one of the two surfaces, and a second point is located in the second one of the two surfaces, and which are situated directly adjacent to each other in the arrangement, and where the normal of the first point runs through the second point and the normal of the second point through the first point. In a transverse direction to the direction of the main light propagation, the contact surfaces are even and feature a curvature in a transverse direction to that. The third section of the light conductor arrangement corresponds to the second section of the light conductor arrangement, except for an exchange of the characteristics of the first light conductor and of the second light conductor. The fourth section corresponds to the first section except that a distance between the second light conductor 12.2 and the coupling arm 32 of the first light conductor 12.1 is gets smaller in a direction of the main light propagation of coupling arm 32 of the first light conductor 12.1.

A coupling arm forms a firmly bonded element with its light conductor. In the sections 1 to 4, the light conductor sections run without any optical contact, separated from each other, whereby they are separated from each other in the sections 2 and 3 by the air gap that occurs between the contact surfaces aligned alongside each other in a plane, point-by-point or line-shaped way. In the transition between the sections 2 and 3, the air gap runs between a center of the front side and a center of the rear side of the light conductor arrangement. The distance between the front side and the rear side has its maximum there (see FIG. 5).

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A lighting device for a motor vehicle having a light conductor arrangement, said device including: a front side and opposite rear side having light deflectors, side areas connecting the front and the rear side arranged in such a way that light which experiences a total internal reflection on the side areas and on the front side is directed into a longitudinal direction of the light conductor arrangement, and to let light reflected at its light deflectors emit through the front side, wherein the light conductor arrangement includes at least one first light conductor and a second light conductor, wherein each one of the two light conductors includes one coupling arm having a first cross section, a light conductor area with a second cross section, and a transition area located between the coupling arm and the light conductor area, wherein the cross section is continually and monotonously enlarging from the first cross section until the second cross section, whereby the coupling arm of each of the two light conductors includes a first contact surface, and the transition area of each of the two light conductors includes a second contact surface, and wherein the first contact surfaces and the second contact surfaces are formed in such a way that the coupling arm of one of the light conductors inserts into the transition area of the respective other light conductor, whereby the second contact surface of the transition area of the one light conductor fits into the first contact surface of the coupling arm of the other light conductor, and in a section of the transition area where each respective coupling arm fits into the other light conductor, each one of the two coupling arms includes deflectors on a rear side of the coupling arm which deflect towards the front side of the coupling arm.

2. The lighting device as set forth in claim 1, wherein the light conductor arrangement has a closed ring shape.

3. The lighting device as set forth in claim 1, wherein each coupling arm and respective light conductor is made in one piece and forms a firmly bonded and continuous unit.

4. The lighting device as set forth in claim 1, wherein the contact surfaces are arched in the respective direction in which the cross section is enlarging, whereby the contact surface of the transition area is concave and the contact surface of the coupling arm is convex.

5. The lighting device as set forth in claim 1, wherein the first cross section is half the size of the second cross section.

6. The lighting device as set forth in claim 1, wherein the contact surfaces only touch to the extent that they are separated by a minimal air gap for the major part of their surface.

7. The lighting device as set forth in claim 1, wherein the widths of the deflectors of the light conductors, which are aligned alongside each other in the transition area, add up to a width that corresponds to the width of the deflectors that are arranged outside of the transition area, or that the widths of the deflectors of the light conductors, which are aligned alongside each other in the transition area, add up to a width, that is larger than the width of the deflectors that are arranged outside of the transition area.

8. The lighting device as set forth in claim 1, wherein a coupling arm of a light conductor is set in an angle with the light conductor area of the respective other light conductor, which is defined in each case by guiding lines of the light conductor area and of the coupling arm.

9. The lighting device as set forth in claim 8, wherein the angle decreases continually with increasing approximation of the coupling arm of the one light conductor towards the light conductor area of the other light conductor, until it has reduced to the value of zero and the guiding lines of the coupling arms thus run parallel to the guiding lines of the light conductor area.

10. The lighting device as set forth in claim 1, wherein the first cross sections of the coupling arms totally disappear inside the cross section of the corresponding light conductor respectively.

11. The lighting device as set forth in claim 1, wherein the two half cross sections, where one belongs to a transition area and the other to a coupling arm, add up to a total cross section at the point where the guiding lines show a parallel course.

12. The lighting device as set forth in claim 1, wherein the contact surfaces of the two light conductors of the light conductor arrangement run tangential towards each other.

13. The lighting device as set forth in claim 1, wherein the front side, which serves as the light output side, is curved convexly.

14. The lighting device as set forth in claim 1, wherein the light conductor arrangement includes a cross section geometry arranged in such a way that through the lens effect achieved by the material of the light conductor arrangement and the curvature of its front side and the width of the light deflectors as well as the remaining width of the side areas outside of the light deflectors in this direction, are mutually aligned in such a way that only the light deflectors are visible through the front side and that the side areas are no longer visible.

* * * * *